United States Patent
Jung et al.

(10) Patent No.: US 10,671,729 B2
(45) Date of Patent: Jun. 2, 2020

(54) ADAPTIVE DYNAMIC ANALYSIS METHOD, ADAPTIVE DYNAMIC ANALYSIS PLATFORM, AND DEVICE EQUIPPED WITH THE SAME

(71) Applicant: Foundation of Soongsil University-Industry Cooperation, Seoul (KR)

(72) Inventors: Souhwan Jung, Seoul (KR); Ngoc-Tu Chau, Seoul (KR); Jungsoo Park, Seoul (KR)

(73) Assignee: FOUNDATION OF SOONGSIL UNIVERSITY-INDUSTRY COOPERATION, Seoul (KR)

(*) Notice: Subject to any disclaimer, the term of this patent is extended or adjusted under 35 U.S.C. 154(b) by 215 days.

(21) Appl. No.: 15/884,085

(22) Filed: Jan. 30, 2018

(65) Prior Publication Data

US 2019/0156035 A1 May 23, 2019

(30) Foreign Application Priority Data

Nov. 22, 2017 (KR) .................... 10-2017-0156281

(51) Int. Cl.
*G06F 11/36* (2006.01)
*G06F 21/56* (2013.01)
(Continued)

(52) U.S. Cl.
CPC ............ *G06F 21/566* (2013.01); *G06F 9/485* (2013.01); *G06F 21/53* (2013.01); *G06F 2221/033* (2013.01)

(58) Field of Classification Search
None
See application file for complete search history.

(56) References Cited

U.S. PATENT DOCUMENTS

2010/0122343 A1* 5/2010 Ghosh ............... G06F 21/55
726/23
2011/0023114 A1 1/2011 Diab et al.
(Continued)

FOREIGN PATENT DOCUMENTS

KR 10-2011-0084693 A 7/2011
KR 10-2012-0114304 A 10/2012
(Continued)

OTHER PUBLICATIONS

Woong Go et al., "A Study on the Activity based Activity Analysis for Mobile Malware", 2016 Winter Conference of Korean Institute of Communication and Information Science, pp. 1087-1088.

*Primary Examiner* — Fatoumata Traore
(74) *Attorney, Agent, or Firm* — Novick, Kim & Lee, PLLC; Sang Ho Lee (57) ABSTRACT

Provided is an adaptive dynamic analysis method, an adaptive dynamic analysis platform and a device equipped with the same. The adaptive dynamic analysis method for an application running in a container environment of a Linux host includes stopping execution of a first activity of the application, and acquiring analysis information for malicious code diagnosis of the application, conducting dynamic analysis using the analysis information, acquiring environment information to execute a second activity based on the dynamic analysis, and performing an execution environment update of the application by reflecting the environment information, and executing the application to enable the second activity to run.

12 Claims, 4 Drawing Sheets

(51) Int. Cl.
*G06F 9/48* (2006.01)
*G06F 21/53* (2013.01)

(56) References Cited

U.S. PATENT DOCUMENTS

| | | | |
|---|---|---|---|
| 2012/0079596 A1* | 3/2012 | Thomas | G06F 21/55 726/24 |
| 2015/0096022 A1* | 4/2015 | Vincent | G06F 21/566 726/23 |
| 2015/0096025 A1* | 4/2015 | Ismael | G06F 21/566 726/23 |
| 2018/0096144 A1* | 4/2018 | Pan | G06F 21/566 |

FOREIGN PATENT DOCUMENTS

| | | |
|---|---|---|
| KR | 10-1386605 B1 | 4/2014 |
| KR | 10-2017-0096451 A | 8/2017 |
| KR | 10-2018-0044507 A | 5/2018 |

* cited by examiner

ADAPTIVE DYNAMIC ANALYSIS METHOD, ADAPTIVE DYNAMIC ANALYSIS PLATFORM, AND DEVICE EQUIPPED WITH THE SAME

CROSS-REFERENCE TO RELATED APPLICATIONS

This application claims priority under 35 U.S.C. § 119 to Korean Patent Application No. 10-2017-0156281, filed on Nov. 22, 2017, in the Korean Intellectual Property Office, the disclosure of which is incorporated herein by reference in its entirety.

TECHNICAL FIELD

The present disclosure relates to an adaptive dynamic analysis method, an adaptive dynamic analysis platform and a device equipped with the same, and more particularly, an adaptive dynamic analysis method for an application running in a container environment of a Linux host, an adaptive dynamic analysis platform and a device equipped with the same.

BACKGROUND

Recently, in response to malicious code analysis, techniques were developed to detect application analysis, tracing and debugging tasks based on parsing prevention. Consequently, application analyzers are experiencing difficulties having to analyze samples and find solutions manually.

Additionally, to enable an application to run, first the main activity is executed, then the next activity is executed by an input value transmitted from the previous activity or trigger, and in case that there is an error in antecedent condition, the application may stop running. In this case, dynamic analysis is limitedly conducted, failing to provide accurate analysis results. Moreover, recently malicious code is becoming intelligent; for example, operating after executing some libraries. Accordingly, in order to prevent malicious code that evolves with the development of technology, there is a need for a new dynamic analysis method.

SUMMARY

An aspect of the present disclosure provides an adaptive dynamic analysis method that expands analysis coverage using a task stop function when necessary.

Another aspect of the present disclosure provides an adaptive dynamic analysis platform that stops a running application and performs an execution environment update for executing a next activity.

According to an aspect of the present disclosure, an adaptive dynamic analysis method for an application running in a container environment of a Linux host is provided. The adaptive dynamic analysis method includes stopping execution of a first activity of the application, and acquiring analysis information for malicious code diagnosis of the application, conducting dynamic analysis using the analysis information, acquiring environment information to execute a second activity based on the dynamic analysis, and performing an execution environment update of the application by reflecting the environment information, and executing the application to enable the second activity to run.

The step of the stopping of execution of the first activity of the application and the acquiring of analysis information may include acquiring the analysis information including so file generated in a Linux container by execution of the first activity of the application.

Additionally, the step of the stopping of execution of the first activity of the application and the acquiring of analysis information may include acquiring the analysis information including dex file generated in a Linux container by execution of the first activity of the application.

Additionally, the step of the stopping of execution of the first activity of the application and the acquiring of analysis information may include acquiring the analysis information including tracing information of the first activity.

Additionally, the step of the stopping of execution of the first activity of the application and the acquiring of analysis information may include controlling a container manager process to stop the execution of the first activity. The container manager process may create the container environment in the Linux host, and accesses a process of the application running in the container environment to acquire the analysis information.

Additionally, the step of the acquiring of environment information to execute the second activity further may include determining whether analysis coverage expansion is required to acquire additional analysis information for dynamic analysis of the application as a result of the dynamic analysis, and acquiring the environment information when determined that the analysis coverage expansion is required.

According to another aspect of the present disclosure, an adaptive dynamic analysis platform is provided. The adaptive dynamic analysis platform includes a Linux host, and a container running on the Linux host. The Linux host includes a dynamic analysis process. The dynamic analysis process may include stopping execution of a first activity of an application running in the container, acquiring analysis information for malicious code diagnosis of the application, conducting dynamic analysis using the analysis information, acquiring environment information to execute a second activity based on the dynamic analysis, performing an execution environment update of the application by reflecting the environment information, and executing the application to enable the second activity to run.

Additionally, the dynamic analysis process may include acquiring the analysis information including so file generated in the container by execution of the first activity of the application.

Additionally, the dynamic analysis process may include acquiring the analysis information including dex file generated in the container by execution of the first activity of the application.

Additionally, the dynamic analysis process may include acquiring the analysis information including tracing information of the first activity.

The Linux host may further include a container manager process which creates a container environment in the Linux host.

The dynamic analysis process may include controlling the container manager process to stop execution of the first activity, and accessing a process of the application running in the container environment to acquire the analysis information.

The dynamic analysis process may further include determining if analysis coverage expansion is required to acquire additional analysis information for dynamic analysis of the application as a result of the dynamic analysis, and acquiring the environment information when determined that the analysis coverage expansion is required.

The dynamic analysis process may further include identifying execution coverage of the first activity in the application to determine if additional analysis of the application is required.

According to the other aspect of the present disclosure, a device equipped with the adaptive dynamic analysis platform is provided. The adaptive dynamic analysis platform may include a Linux host, and a container running on the Linux host. The Linux host includes a dynamic analysis process. The dynamic analysis process includes stopping execution of a first activity of an application running in the container, acquiring analysis information for malicious code diagnosis of the application, conducting dynamic analysis using the analysis information, acquiring environment information to execute a second activity based on the dynamic analysis, performing an execution environment update of the application by reflecting the environment information, and executing the application to enable the second activity to run.

According to an aspect of the present disclosure described above, analysis coverage expansion allows for collection of sufficient analysis information for dynamic analysis, thereby deriving more accurate analysis results.

According to another aspect of the present disclosure described above, it is possible to implement a dynamic analysis sandbox with automation and improved analysis coverage.

DETAILED DESCRIPTION OF EMBODIMENTS

These and other advantages and features of the present disclosure and methods for achieving them will be apparent from the embodiments described in detail below with reference to the accompanying drawings. However, the present disclosure is not limited to the following disclosed embodiments and will be embodied in many different forms, and these embodiments are only provided to make the disclosure complete and help those having ordinary skill in the technical field pertaining to the present disclosure to understand the scope of the invention fully, and the present disclosure is only defined by the scope of the appended claims. Like reference numerals indicate like elements throughout the specification.

The terminology used herein is only for the purpose of describing the embodiments and is not intended to be limiting of the present disclosure. As used herein, the singular forms are intended to include the plural forms as well, unless the context clearly indicates otherwise. The term "comprises" and/or "comprising" when used in this specification specify the presence of stated elements, steps and operations, but do not preclude the presence or addition of one or more other elements, steps and operations.

Figure 1:
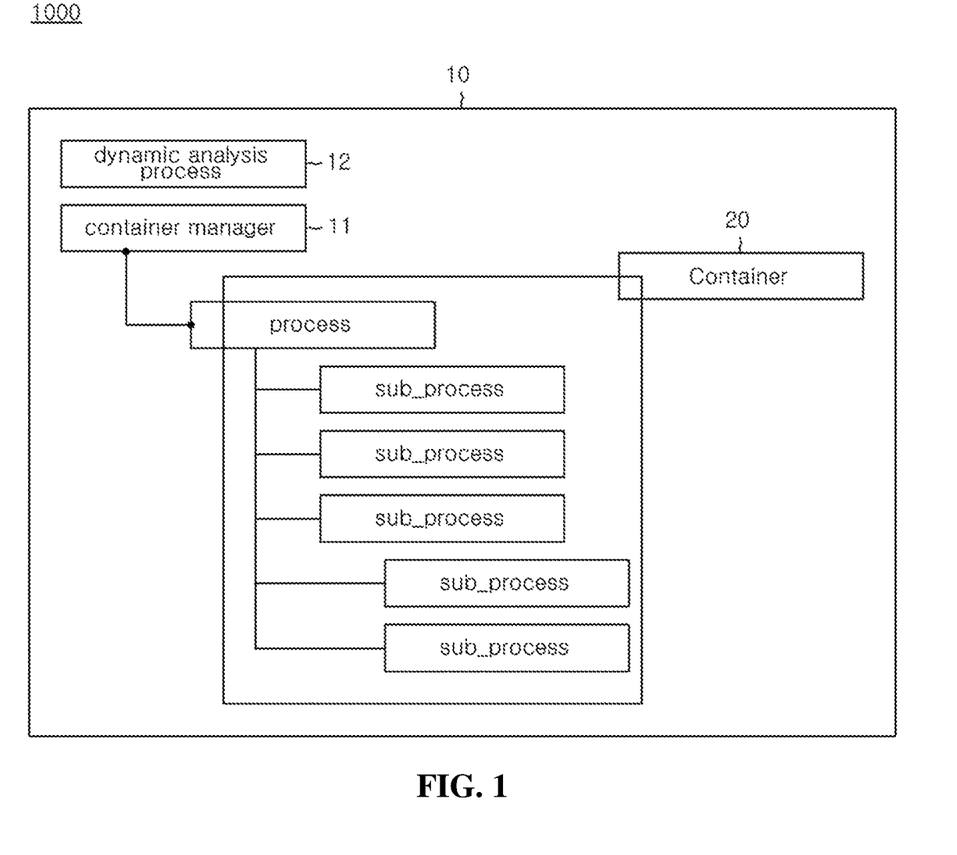
FIG. 1 is a conceptual diagram of an adaptive dynamic analysis platform according to an embodiment of the present disclosure.

FIG. 1 is a conceptual diagram of an adaptive dynamic analysis platform according to an embodiment of the present disclosure.

Referring to FIG. 1, the adaptive dynamic analysis platform 1000 according to an embodiment of the present disclosure may include a Linux host 10 and a container 20.

Specifically, the Linux host 10 is a type of operating system. The Linux host 10 may run the container 20 by applying container technology. The container technology is technology to provide an isolated virtual space of operating system level using namespace and control groups (cgroups). The adaptive dynamic analysis platform 1000 may create the container 20 environment for application analysis by running the container 20 on the Linux host 10. The adaptive dynamic analysis platform 1000 may be mounted on a device which can run a variety of applied programs based on the operating system.

The Linux host 10 may execute a dynamic analysis process 12 that is included in the Linux host 10. The dynamic analysis process 12 may access a process of an application that runs on the container 20 to collect information for dynamic analysis and conduct dynamic analysis.

The Linux host 10 may execute a container manager process 11 that is included in the Linux host 10, and the container manager process 11 creates the container 20 environment and controls a process running in the container 20 environment. The container manager process 11 may stop a task of a process running in the container 20 using a task stop function. The adaptive dynamic analysis platform 1000 according to an embodiment of the present disclosure may provide an adaptive dynamic analysis environment of the application using the task stop function. In relation to this, a description will be provided with reference to FIGS. 2 and 3.

Figure 2:
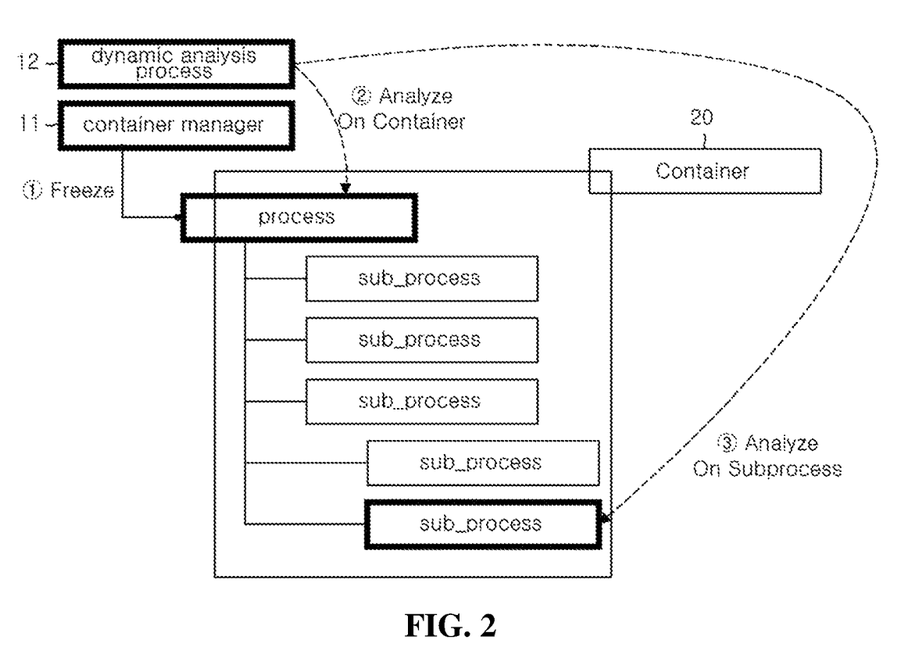
FIG. 2 is a diagram illustrating a task stop function in an adaptive dynamic analysis platform according to an embodiment of the present disclosure.
Figure 3:
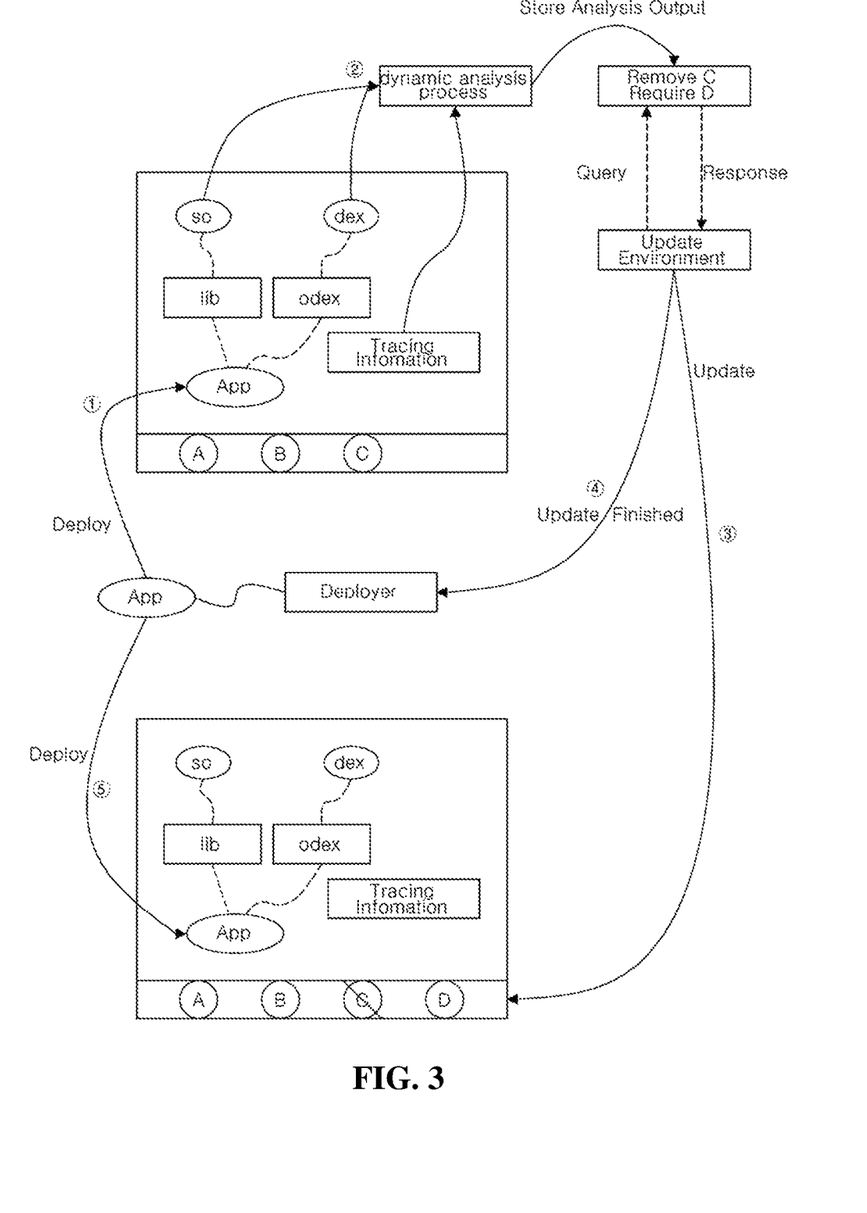
FIG. 3 is a conceptual diagram showing an example of adaptive dynamic analysis in an adaptive dynamic analysis platform according to an embodiment of the present disclosure.

FIG. 2 is a diagram illustrating the task stop function in the adaptive dynamic analysis platform according to an embodiment of the present disclosure, and FIG. 3 is a conceptual diagram showing an example of adaptive dynamic analysis in the adaptive dynamic analysis platform according to an embodiment of the present disclosure.

Referring to FIG. 2, the container manager process 11 may create the container 20 environment by generating sub-processes and providing separate namespace. The container manager process 11 may stop the operation of the container 20. The container manager process 11 is a parent process of an init process running in the container 20, and may stop the init process using the task stop function. The container manager process 11 may stop the sub-processes in a sequential order by stopping the init process running in the container 20.

The dynamic analysis process 12 belongs to the Linux host 10, and even though the container 20 stops running, the dynamic analysis process 12 may continuously run. When a process running in the container 20 stops, the dynamic analysis process 12 may access the corresponding process to collect information and conduct analysis.

Referring to FIG. 3, an application (APK) may run in the container 20 environment of the Linux host 10 first. When an activity in a process of the application is executed, the execution of the activity may be stopped by the container manager process 11. The dynamic analysis process 12 may access lib and odex generated in the container 20 to acquire so file or dex file as analysis information. Additionally, the dynamic analysis process 12 may acquire tracing information of the current activity as analysis information.

The dynamic analysis process 12 may conduct dynamic analysis using analysis information of the current activity. The dynamic analysis process 12 may acquire environment information (Remove C, Require D) necessary to execute the next activity through dynamic analysis. For example, the dynamic analysis process 12 may acquire environment information including an input value and a trigger value necessary to execute the next activity from analysis information generated by the execution of the current activity. The dynamic analysis process 12 may perform an execution environment update of the application by reflecting the acquired environment information. When the execution environment update is completed, the container manager process 11 may cancel the task stop function to execute the application process again to enable the next activity to run.

As described above, according to the adaptive dynamic analysis platform 1000 according to an embodiment of the present disclosure, it is possible to expand analysis coverage and derive more accurate dynamic analysis results. For example, when an application runs in the container 20, a process for executing a main activity of the application can be generated. Furthermore, a sub-process for executing a next activity may be generated by an input value transmitted from a previous activity or a trigger. In this instance, when there is an error in the antecedent condition of the input value transmitted from the previous activity or the trigger, the application may stop running. In this case, dynamic analysis of the application is limitedly conducted, which makes it difficult to derive sufficient analysis results. According to the adaptive dynamic analysis platform 1000 according to an embodiment of the present disclosure, after stopping the task of the application running in the container 20 environment using the task stop function, the analysis coverage can be extended by acquiring information for dynamic analysis to perform dynamic analysis, acquiring environment information necessary for execution of the next activity, and then performing execution environment update. Hereinafter, an adaptive dynamic analysis method in the adaptive dynamic analysis platform 1000 according to an embodiment of the present disclosure will be described in detail with reference to FIG. 4.

Figure 4:
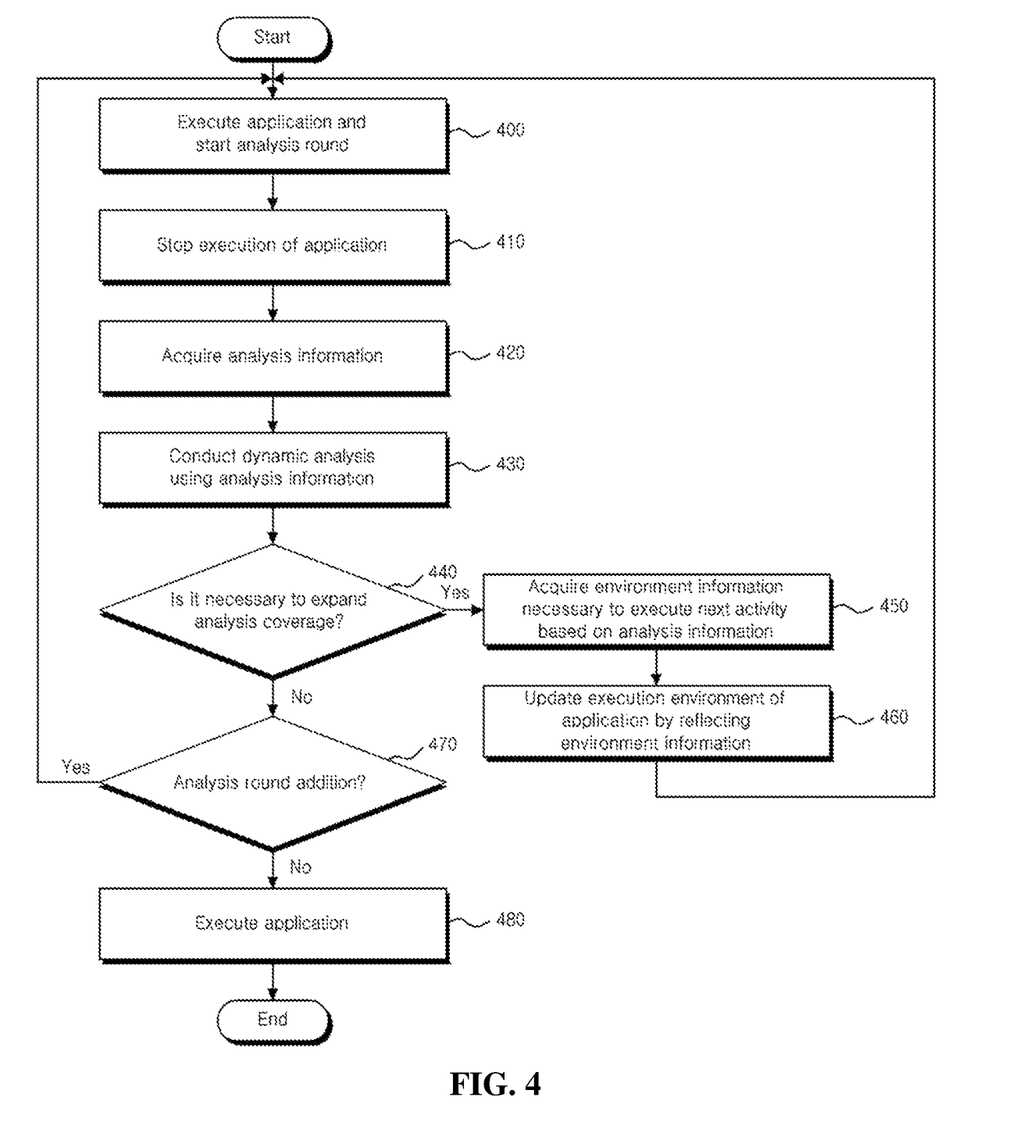
FIG. 4 is a flowchart of an adaptive dynamic analysis method according to an embodiment of the present disclosure.

FIG. 4 is a flowchart of the adaptive dynamic analysis method according to an embodiment of the present disclosure.

Referring to FIG. 4, an application may run in the container 20 environment of the Linux host 10, and an analysis round for malicious code analysis of the application may start (400).

The dynamic analysis process 12 that belongs to the Linux host 10 may stop the application running through the container manager process 11 (410). The dynamic analysis process 12 may stop execution of the current activity of the application.

The dynamic analysis process 12 may access a process of the application generated in the container 20 to acquire analysis information (420). The dynamic analysis process 12 may access a process generated in the container 20 to execute the current activity of the application, and acquire analysis information by extracting so file or dex file. Additionally, the dynamic analysis process 12 may acquire analysis information by extracting tracing information associated with the execution of the current activity.

The dynamic analysis process 12 may conduct dynamic analysis using the analysis information (430). For example, the dynamic analysis process 12 may conduct dynamic analysis to determine if the application has malicious code or performs malicious activity based on the analysis information.

The dynamic analysis process 12 may determine if it is necessary to expand analysis coverage based on the dynamic analysis results (440). The dynamic analysis process 12 may determine if analysis coverage expansion is necessary to acquire additional analysis information needed for dynamic analysis of the application based on the dynamic analysis results. For example, the dynamic analysis process 12 may determine that analysis coverage expansion is necessary when information necessary for dynamic analysis is insufficient or inconsistent.

When analysis coverage expansion is determined to be necessary (440), the dynamic analysis process 12 may acquire environment information needed to execute a next activity based on the analysis information (450). The dynamic analysis process 12 may acquire environment information including an input value and a trigger value necessary to execute the next activity from the analysis information acquired from the process generated by executing the current activity.

The dynamic analysis process 12 may perform an execution environment update of the application by reflecting the environment information (460). The dynamic analysis process 12 may perform an execution environment update of the container 20 by reflecting the environment information to prevent a collision when executing the next activity.

When the execution environment update is completed, the dynamic analysis process 12 may execute the application through the container manager process 11 and start an analysis round (400). The dynamic analysis process 12 may execute the application again to enable the next activity to run, and may start a next analysis round.

Meanwhile, when analysis coverage expansion is determined to be unnecessary (440), the dynamic analysis process 12 may determine if an analysis round is to be added (470). For example, the dynamic analysis process 12 may identify execution coverage of the activity currently running in the application to determine if an additional analysis round is necessary.

When analysis round addition is determined to be necessary (470), the dynamic analysis process 12 may execute the application again and start the next analysis round (400).

When analysis round addition is determined to be unnecessary (470), the dynamic analysis process 12 may execute the application again to terminate the application (480).

The adaptive dynamic analysis method as described above may be implemented in the form of program commands that are executed through various computer components and may be recorded in computer-readable recording media. The computer-readable recording media may include program commands, data files and data structures, alone or in combination.

The program commands recorded in the computer-readable recording media may be specially designed and configured for the present disclosure, and may be known and available to those having ordinary skill in the field of computer software.

Examples of the computer-readable recording media includes hardware devices specially designed to store and execute program commands; for example, magnetic media such as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the operation according to the present disclosure, or vice versa.

While the embodiments of the present disclosure have been hereinabove described with reference to the accompanying drawings, it will be appreciated by those having ordinary skill in the technical field pertaining to the present disclosure that the present disclosure may be embodied in other specific forms without changing the technical spirit or essential features of the present disclosure. Therefore, it should be understood that the embodiments described above are for illustration purposes only in all aspects, but not intended to be limiting.

What is claimed is:

1. An adaptive dynamic analysis method for an application running in a container environment of a Linux host, the adaptive dynamic analysis method comprising:
stopping execution of a first activity of the application, and acquiring analysis information for malicious code diagnosis of the application;
conducting dynamic analysis using the analysis information;
acquiring environment information to execute a second activity based on the dynamic analysis; and
performing an execution environment update of the application by reflecting the environment information, and executing the application to enable the second activity to run,
wherein the step of the stopping of execution of the first activity of the application and the acquiring of analysis information comprises controlling a container manager process to stop the execution of the first activity,
wherein the container manager process creates the container environment in the Linux host, and accesses a process of the application running in the container environment to acquire the analysis information, and
wherein the container manager process is a parent process of an init process running in the container environment and the container manager process stops the init process to stop the execution of the first activity.

2. The adaptive dynamic analysis method of claim 1, wherein the step of the stopping of execution of the first activity of the application and the acquiring of analysis information further comprises acquiring the analysis information including so file generated in a Linux container by execution of the first activity of the application.

3. The adaptive dynamic analysis method of claim 1, wherein the step of the stopping of execution of the first activity of the application and the acquiring of analysis information further comprises acquiring the analysis information including dex file generated in a Linux container by execution of the first activity of the application.

4. The adaptive dynamic analysis method of claim 1, wherein the step of the stopping of execution of the first activity of the application and the acquiring of analysis information further comprises acquiring the analysis information including tracing information of the first activity.

5. The adaptive dynamic analysis method of claim 1, wherein the step of the acquiring of environment information to execute the second activity further comprises determining whether analysis coverage expansion is required to acquire additional analysis information for dynamic analysis of the application as a result of the dynamic analysis, and acquiring the environment information when determined that the analysis coverage expansion is required.

6. An adaptive dynamic analysis platform comprising:
a Linux host; and
a container running on the Linux host,
wherein the Linux host includes a dynamic analysis process, the dynamic analysis process including stopping execution of a first activity of an application running in the container, acquiring analysis information for malicious code diagnosis of the application, conducting dynamic analysis using the analysis information, acquiring environment information to execute a second activity based on the dynamic analysis, performing an execution environment update of the application by reflecting the environment information, and executing the application to enable the second activity to run,
wherein the Linux host further includes a container manager process which creates a container environment in the Linux host,
wherein the dynamic analysis process includes controlling the container manager process to stop execution of the first activity, and accessing a process of the application running in the container environment to acquire the analysis information, and
wherein the container manager process is a parent process of an init process running in the container environment and the container manager process stops the init process to stop the execution of the first activity.

7. The adaptive dynamic analysis platform of claim 6, wherein the dynamic analysis process further includes acquiring the analysis information including so file generated in the container by execution of the first activity of the application.

8. The adaptive dynamic analysis platform of claim 6, wherein the dynamic analysis process further includes acquiring the analysis information including dex file generated in the container by execution of the first activity of the application.

9. The adaptive dynamic analysis platform of claim 6, wherein the dynamic analysis process further includes acquiring the analysis information including tracing information of the first activity.

10. The adaptive dynamic analysis platform of claim 6, wherein the dynamic analysis process further includes determining if analysis coverage expansion is required to acquire additional analysis information for dynamic analysis of the application as a result of the dynamic analysis, and acquiring the environment information when determined that the analysis coverage expansion is required.

11. The adaptive dynamic analysis platform of claim 6, wherein the dynamic analysis process further includes identifying execution coverage of the first activity in the application to determine if additional analysis of the application is required.

12. A device equipped with an adaptive dynamic analysis platform, wherein the adaptive dynamic analysis platform comprises:
a Linux host; and
a container running on the Linus host,
wherein the Linux host includes a dynamic analysis process, the dynamic analysis process including stopping execution of a first activity of an application running in the container, acquiring analysis information for malicious code diagnosis of the application, conducting dynamic analysis using the analysis information, acquiring environment information to execute a second activity based on the dynamic analysis, performing an execution environment update of the application by reflecting the environment information, and executing the application to enable the second activity to run, wherein the Linux host further includes a container manager process which creates a container environment in the Linux host, wherein the dynamic analysis process includes controlling the container manager process to stop execution of the first activity, and accessing a process of the application running in the container environment to acquire the analysis information, and wherein the container manager process is a parent process of an init process running in the container environment and the container manager process stops the init process to stop the execution of the first activity.

* * * * *